US010645944B2

United States Patent
Shi et al.

(10) Patent No.: US 10,645,944 B2
(45) Date of Patent: May 12, 2020

(54) METHOD FOR BREWING COFFEE AND HAVING ENHANCED AROMA RELEASE

(71) Applicant: KONINKLIJKE PHILIPS N.V., Eindhoven (NL)

(72) Inventors: Jun Shi, Eindhoven (NL); Lucia Lu, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 233 days.

(21) Appl. No.: 15/577,463

(22) PCT Filed: May 26, 2016

(86) PCT No.: PCT/EP2016/061900
§ 371 (c)(1),
(2) Date: Nov. 28, 2017

(87) PCT Pub. No.: WO2016/193116
PCT Pub. Date: Dec. 8, 2016

(65) Prior Publication Data
US 2018/0139980 A1 May 24, 2018

(30) Foreign Application Priority Data

Jun. 5, 2015 (WO) ................ PCT/CN2015/080912
Jul. 2, 2015 (EP) ..................... 15174958

(51) Int. Cl.
*A47J 31/42* (2006.01)
*A23F 5/26* (2006.01)
(Continued)

(52) U.S. Cl.
CPC ............... *A23F 5/262* (2013.01); *A47J 31/06* (2013.01); *A47J 31/42* (2013.01); *A47J 31/44* (2013.01); *A47J 31/465* (2013.01); *A47J 31/56* (2013.01)

(58) Field of Classification Search
CPC .... A23F 5/26; A23F 5/262; A23F 3/18; A47J 31/002; A47J 31/42; A47J 31/0573;
(Continued)

(56) References Cited

U.S. PATENT DOCUMENTS

2006/0005712 A1   1/2006   Greenwald
2007/0068393 A1   3/2007   Nosler
(Continued)

FOREIGN PATENT DOCUMENTS

CA          2071893 A1    4/1991
CN        101384200 A     3/2009
(Continued)

*Primary Examiner* — Hong T Yoo
(74) *Attorney, Agent, or Firm* — Schott, P.C.

(57) ABSTRACT

A method for brewing coffee involves providing two separate quantities of coffee particles, wherein only a first quantity of coffee particles is used for an actual process of brewing coffee by causing this quantity to interact with an extracting medium, and wherein another, secondary quantity of coffee particles is heated for enhanced aroma release. The second quantity may be small compared to the first quantity. The two separate quantities of coffee particles may be obtained by first providing a single quantity of coffee particles, for example by grinding a number of coffee beans in a grinding module (20), and then dividing the single quantity into the two quantities. In a device (1) which is suitable for carrying out the method, a dividing arrangement (40) may be applied for realizing a suitable distribution of coffee particles over a brewing chamber (10) and a heating module (30) of the device (1).

15 Claims, 2 Drawing Sheets

(51) Int. Cl.
*A47J 31/44* (2006.01)
*A47J 31/46* (2006.01)
*A47J 31/56* (2006.01)
*A47J 31/06* (2006.01)

(58) Field of Classification Search
CPC .... A47J 31/3609; A47J 31/4403; A47J 31/44; A47J 31/4439
See application file for complete search history.

(56) References Cited

U.S. PATENT DOCUMENTS

| | | |
|---|---|---|
| 2014/0076167 A1 | 3/2014 | Boggavarapu |
| 2014/0242239 A1* | 8/2014 | Boggavarapu ............ A23F 5/26 426/433 |

FOREIGN PATENT DOCUMENTS

| | | |
|---|---|---|
| CN | 103549092 A | 2/2014 |
| DE | 10147284 A1 | 4/2003 |
| GB | 716867 A | 10/1954 |
| WO | 2014043652 A1 | 3/2014 |
| WO | 2014185783 A1 | 11/2014 |

* cited by examiner

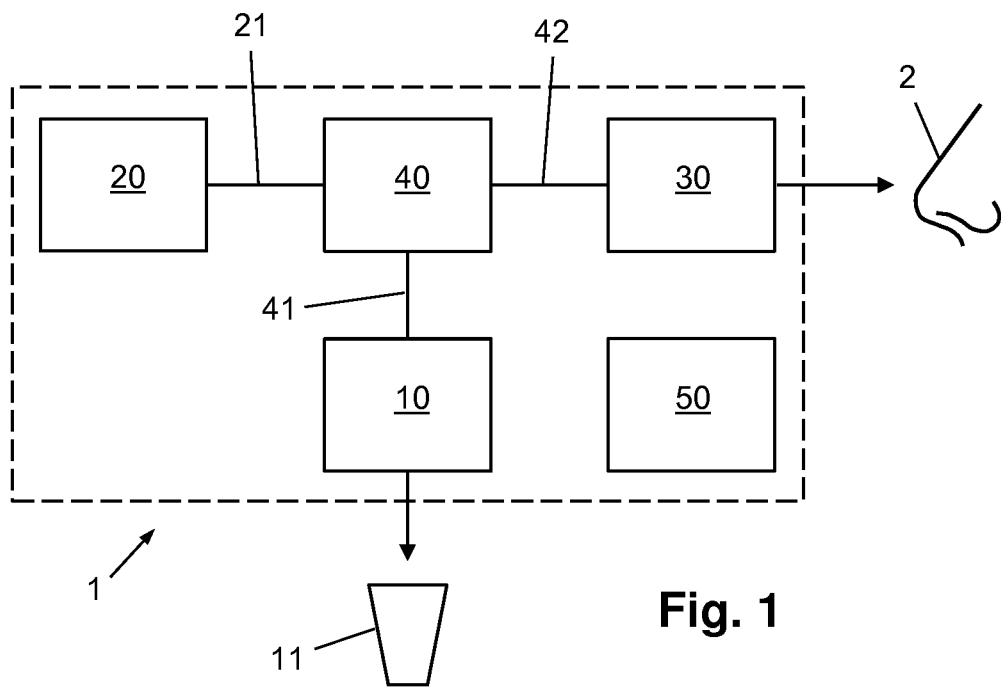
Fig. 1
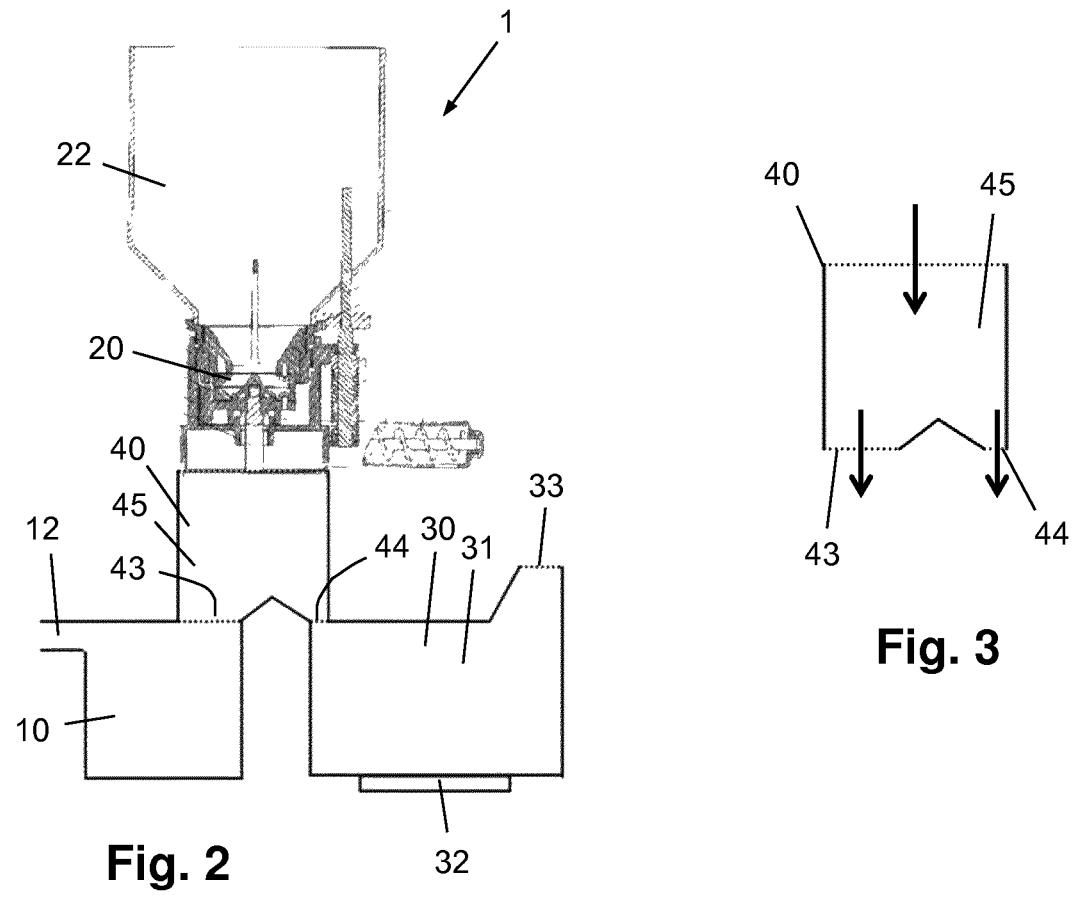
Fig. 2
Fig. 3

METHOD FOR BREWING COFFEE AND HAVING ENHANCED AROMA RELEASE

This application is the U.S. National Phase application under 35 U.S.C. § 371 of International Application No. PCT/EP2016/061900, filed on May 26, 2016, which claims the benefit of International Application No. PCT/CN2015/080912 filed Jun. 5, 2015 and International Application No. 15174958.7 filed on Jul. 2, 2015. These applications are hereby incorporated by reference herein.

FIELD OF THE INVENTION

The invention relates to a method for brewing coffee in a device comprising a brewing chamber and a distribution path for distributing coffee particles through the device, the distribution path opening into the brewing chamber, wherein a quantity of coffee particles is supplied to the brewing chamber through the distribution path and used for an actual process of brewing coffee by causing this quantity to interact with an extracting medium in the brewing chamber. The invention further relates to a device for brewing coffee, comprising a brewing chamber for accommodating an actual process of brewing coffee on the basis of an interaction of a quantity of coffee particles with an extracting medium, wherein the device is equipped with a distribution path for distributing coffee particles through the device, the distribution path opening into the brewing chamber.

BACKGROUND OF THE INVENTION

Brewing coffee by providing a quantity of coffee particles, for example, a quantity of coffee powder, i.e. a quantity of ground coffee beans, and causing the quantity of coffee particles to interact with an extracting medium such as hot water is a well-known process. Many types of devices have been developed for carrying out such a process in a more or less automated manner. One type of device is suitable to be operated for providing a quantity of coffee for a single cup in a relatively short period of time. In a device of such type, which is often referred to as a single-serve coffee maker, the coffee particles may be provided as powder in pads or capsules. Alternatively, it is possible for a single-serve coffee maker to comprise a grinding module for grinding coffee beans to coffee powder, giving a user of the coffee maker a sense of optimal freshness of the coffee.

Research has shown that consumers enjoy the smell of coffee generated during a grinding process and/or a brewing process, and that the perception of quality of the coffee is linked to such smell. However, in a single-serve coffee maker, the quantity of coffee particles which is processed is so small that aroma release from the coffee maker is very limited. Even in case the coffee maker comprises a grinding module, it is hardly possible for the user of the coffee maker to smell the aroma. The fact is that only about 20 grams of coffee beans need to be ground for the purpose of making one cup of coffee. Moreover, in many cases, the grinding module is not open to the environment of the coffee maker. The same is true in respect of the brewing chamber, with the exception of the outlet which serves for dispensing coffee, and which is not suitable for allowing aroma to escape from the brewing chamber as a consequence thereof.

WO 2014/185783 discloses a coffee brewing apparatus comprising an entrance opening for receiving coffee beans, a grinder for grinding coffee beans which have entered the coffee brewing apparatus via the entrance opening, a ground coffee transportation path for transporting ground coffee from the grinder to a brewing device, the brewing device being adapted to brew coffee on the basis of the delivered ground coffee, and an air ventilation system in fluid connection with the grinder for providing at least one air stream comprising a coffee grinding aroma to the outside of the coffee brewing apparatus and preferably in the direction of a user of the apparatus. Hence, in the apparatus known from WO 2014/185783, the grinder is open to the environment of the apparatus. However, in spite of the use of the air ventilation system, the user can only be provided with a limited sense of coffee aroma in view of the fact that a small quantity of coffee beans is ground, suitable for obtaining one cup of coffee as explained earlier. Hence, the problem of the user having a perception of reduced quality of the operation of a single-serve coffee maker based on a lack of coffee smell is not completely solved by applying the measures known from WO 2014/185783.

SUMMARY OF THE INVENTION

It is an object of the invention to alleviate the problem of very limited aroma release, if any, from conventional single-serve coffee makers. This object is achieved on the basis of a method for brewing coffee as developed in the context of the invention, wherein two separate quantities of coffee particles are provided, wherein only a first quantity of coffee particles is used for an actual process of brewing coffee by causing this quantity to interact with an extracting medium, and wherein another, second quantity of coffee particles is heated for enhanced aroma release. In particular, the invention relates to a method for brewing coffee in a device comprising a brewing chamber, a heating module being separate from the brewing chamber and having an outlet in communication with outside of the device, a first distribution path for distributing coffee particles through the device, the first distribution path opening into the brewing chamber, and a second distribution path for distributing coffee particles through the device, the second distribution path opening into the heating module, wherein two separate quantities of coffee particles are provided, wherein only a first quantity of coffee particles is supplied to the brewing chamber through the first distribution path and used for an actual process of brewing coffee by causing this quantity to interact with an extracting medium in the brewing chamber, and wherein another, secondary quantity of coffee particles is supplied to the heating module through the second distribution path and heated in the heating module for enhanced aroma release.

According to the invention, a heating process of a quantity of coffee particles is applied for realizing aroma release to such an extent that a consumer may be expected to have a perception of good quality of the coffee making process. In particular, the quantity of coffee particles to be subjected to the heating process is separate from a quantity of coffee particles as actually used for making coffee. On the basis of these facts, the invention provides for a useful simulation of abundant aroma release from a grinding process and/or a brewing process. What's more, the invention avoids loss of aroma from the coffee particles that is used for making the coffee, so that the improvement of the consumer's perception of the quality of the coffee making process is not limited by a deterioration of the taste of the coffee. This aspect of the invention is a considerable improvement with respect to known measures based on having an air stream for transporting aroma from coffee powder that is intended to be used for making coffee, such as taught by WO 2014/185783.

For the sake of completeness, it is noted that the term aroma as used in this text is intended to indicate smell as can be sensed by a consumer. In fact, the sensation of coffee aroma is based on a release of gases from the coffee, the gases comprising volatile organic compounds (VOC).

In a practical application of the invention, the two separate quantities of coffee particles may be obtained by first providing a single quantity of coffee particles and then dividing the single quantity into the two quantities. In this way, it is ensured that the aroma obtained by heating the second quantity of coffee particles is representative of the coffee as made on the basis of the first quantity of coffee particles. In the process, a dividing arrangement coupled to the both the first distribution path and the second distribution path of the device may be applied, wherein a single quantity of coffee particles is first provided to the dividing arrangement and then divided into the two quantities.

For example, it is possible to apply a sieve for dividing the single quantity into the two quantities by separating relatively large coffee particles from relatively small coffee particles, wherein a first resulting quantity having the relatively large coffee particles is taken as the first quantity to be used in the actual process of brewing coffee, and wherein a second resulting quantity having the relatively small coffee particles is taken as the second quantity to be used for enhanced aroma release. An additional advantage of making a division on the basis of particle size is that only using relatively large particles for making coffee is beneficial to the taste of the coffee. The fact is that smaller particles can get over extracted in a brewing process, which will cause the coffee to be bitter. Thus, when a distinction between the first quantity of coffee particles and the second quantity of coffee particles is made on the basis of particle size, both aroma enhancement and taste improvement are obtained.

According to a practical possibility existing within the framework of the invention, a heating process of the second quantity of coffee particles is initiated simultaneously with a process of brewing coffee on the basis of the first quantity of coffee particles. An advantage of this possibility is that the consumer is allowed to sense the coffee aroma during the brewing process, which adds to the consumer's perception of quality of the brewing process and the coffee obtained by means of the brewing process.

Preferably, a maximum temperature of a heating process of the second quantity of coffee particles is controlled to be 150° C. at the level of the coffee particles. The fact is that at a temperature higher than 150° C., particularly a temperature higher than 170° C., chemical reactions may occur in the coffee particles, which may create unpleasant smells. By keeping the temperature of the coffee particles lower than 150° C., it is ensured that the heating process of the coffee particles only results in acceleration of the emission of aroma from the coffee particles.

Preferably, the second quantity of coffee particles is chosen to be significantly smaller than the first quantity of coffee particles. For example, the second quantity of coffee particles may be nine times smaller than the first quantity of coffee particles, and still be sufficient for realizing the aroma enhancement as desired. In case the two quantities of coffee particles are obtained by first providing a single quantity of coffee particles and then dividing the single quantity into the two quantities, this means that $9/10$ of the single quantity may be used as the first quantity, and that $1/10$ of the single quantity may be used as the second quantity. In any case, only a small quantity of coffee particles is enough for realizing significant aroma enhancement.

The invention also relates to a device for brewing coffee, comprising a brewing chamber for accommodating an actual process of brewing coffee on the basis of an interaction of a quantity of coffee particles with an extracting medium, and further comprising a heating module for heating a quantity of coffee particles, the heating module being separate from the brewing chamber and having an outlet in communication with outside of the device for allowing aroma released from the coffee particles during a heating process to escape from the device, wherein the device is equipped with a first distribution path for distributing coffee particles through the device, the first distribution path opening into the brewing chamber, and further with a second distribution path for distributing coffee particles through the device, the second distribution path opening into the heating module. On the basis of the presence in the device of the brewing chamber, the heating module, the first distribution path associated with the brewing chamber, and the second distribution path associated with the heating module, the device is particularly suitable to be used for processing the first quantity of coffee particles and the second quantity of coffee particles as described in the foregoing, wherein the first quantity of coffee particles is used for making coffee, and wherein the second quantity of coffee particles is used for creating aroma. At the position of the outlet of the heating module, ventilation means such as a fan may be used for enhancing and/or directing an airflow carrying the aroma. The fact that the heating module is denoted as being separate from the brewing chamber should be understood such as to imply that the heating module is adapted to process another quantity of coffee particles than the brewing chamber, which does not alter the fact that the brewing chamber and the heating module may be arranged in any practical position with respect to each other, wherein it is possible to have a side-by-side configuration of the brewing chamber and the heating module if so desired in the layout of the device according to the invention.

The heating module which is adapted to be used for aroma enhancement is arranged in the device according to the invention in addition to at least one other heating module as may be part of the device for the purpose of heating the extracting medium, such as a boiler or a flow through heater for heating water. In a particular embodiment, it may be so that the heating module for aroma enhancement and the heating module for heating the extracting medium have a common heating element. The term "heating module" as used in this text should be understood such as to relate to the heating module for aroma enhancement.

Typically, the device according to the invention is adapted to accommodating separate flows of coffee particles, one flow being through the brewing chamber, and another flow being through the heating module, wherein the coffee particles from the latter flow are not used in the process of making coffee. In view of the separate character of the two flows of coffee particles, at least as far as their destinations are concerned, the distribution paths of the device can be denoted as being parallel. It is noted that in this context, the term parallel should be understood in a functional sense, and not as being an indication of mutual positioning. The device may comprise two waste bins or the like for receiving used-up coffee particles, wherein each of the flows ends in another one of those bins, but it is also possible for the device to comprise only a single waste bin or the like, which is a common waste bin for receiving used-up coffee particles from both the brewing chamber and the heating module.

As mentioned in the foregoing, the two separate quantities of coffee particles are obtained by first providing a single quantity of coffee particles and then dividing the single quantity into the two quantities. In view thereof, the device according to the invention may comprise a dividing arrangement as already mentioned in the context of the method according to the invention, namely a dividing arrangement coupled to both the first distribution path and the second distribution path, the dividing arrangement being adapted to receive a single quantity of coffee particles, to discharge a first quantity of coffee particles to the first distribution path for the purpose of an actual process of brewing coffee, and to additionally discharge another, second quantity of coffee particles to the second distribution path for the sole purpose of aroma release. In this respect, it is noted that the dividing arrangement is preferably adapted to let the second quantity of coffee particles be significantly smaller than the first quantity of coffee particles.

In a first practical embodiment, the dividing arrangement comprises a chamber for allowing the single quantity of coffee particles to pass through, the chamber having a first outlet opening for discharging the first quantity of coffee particles to the first distribution path, and a second outlet opening for discharging the second quantity of coffee particles to the second distribution path, the second outlet opening being significantly smaller than the first outlet opening. In this embodiment, a ratio of the two quantities of coffee particles is determined on the basis of a ratio of the size of the outlet openings.

In a second practical embodiment, the dividing arrangement comprises a sieve for separating relatively large coffee particles from relatively small coffee particles, the sieve being arranged with respect to the first distribution path and the second distribution path so as to enable on the one hand a discharge of a first resulting quantity having the relatively large coffee particles to the first distribution path, and to enable on the other hand a discharge of a second resulting quantity having the relatively small coffee particles to the second distribution path. As explained in the foregoing, subjecting an initial quantity of coffee particles to a sieving action has an additional advantage, namely improvement of the taste of the coffee, provided that the relatively large particles are used for making the coffee, and that the relatively small particles are used for aroma enhancement.

It is practical for the device according to the invention to comprise a grinding module for grinding coffee beans to coffee powder to be distributed through the device by means of the first distribution path and the second distribution path. In case the device is equipped with a dividing arrangement as described in the foregoing, it is advantageous if the dividing arrangement is coupled to the grinding module for receiving coffee powder particles from the grinding module. It is an option for the grinding module to be open to the environment of the device according to the invention, so that aroma released from the coffee beans during the grinding process may be sensed by a user of the device.

Further, it is practical for the device according to the invention to comprise a controller for controlling operation of the device. Such controller may be adapted to activate the heating module simultaneously with initiating a supply of extracting medium to the brewing chamber, so that release of aroma from the heating module to the environment of the device may take place right from the start of the brewing process. That does not alter the fact that other options are possible in the framework of the invention as well. For example, in case the device according to the invention comprises a grinding module as mentioned earlier, the device may be equipped with a buffer for containing a quantity of coffee powder particles to be supplied to the heating module for enabling aroma enhancement during a grinding process. The use of a controller also offers an option of setting a level of aroma release from the device. To this end, the controller may be adapted to vary the second quantity of coffee particles and/or to vary the temperature of the heating module. In this respect, the device may comprise a user interface which allows a user of the device to input his/her preferences as to coffee aroma.

The above-described and other aspects of the invention will be apparent from and elucidated with reference to the following detailed description of two embodiments of a device for brewing coffee, comprising a brewing chamber for accommodating an actual process of brewing coffee, and a heating module for release of aroma to the environment of the device.

BRIEF DESCRIPTION OF THE DRAWINGS

The invention will now be explained in greater detail with reference to the figures, in which equal or similar parts are indicated by the same reference signs, and in which:

FIG. 1 illustrates a possible general layout of a device for brewing coffee according to the invention;

FIG. 2 diagrammatically shows a number of components of a device for brewing coffee according to a first embodiment;

FIG. 3 diagrammatically shows a dividing arrangement of the device as shown in FIG. 2, wherein an incoming flow of coffee powder and two outgoing flows of coffee powder are indicated by means of arrows;

DETAILED DESCRIPTION OF THE EMBODIMENTS

Figure 4:
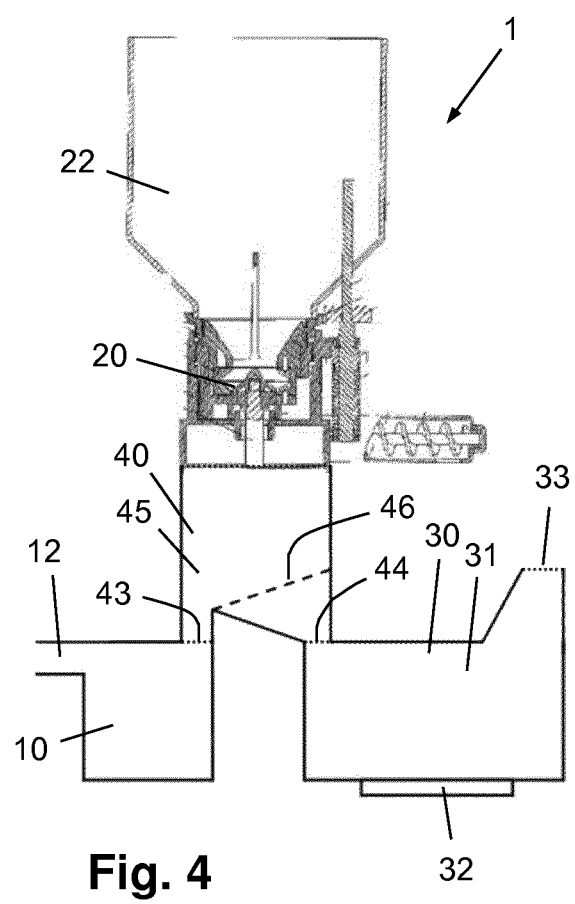
FIG. 4 diagrammatically shows a number of components of a device for brewing coffee according to a second embodiment.

FIG. 1 illustrates a possible general layout of a device for brewing coffee according to the invention, which will hereinafter be referred to as coffee maker 1.

The coffee maker 1 according to the invention is particularly suitable for making coffee by providing a quantity of coffee powder and causing the quantity of coffee powder to interact with hot water. To this end, the coffee maker 1 comprises a brewing chamber 10, i.e. a chamber 10 where the actual brewing process takes place during operation of the coffee maker 1. In a practical embodiment, the coffee maker 1 is suitable for dispensing coffee for filling one cup 11 at a time, although this is not essential in the framework of the invention. The brewing chamber 10 may be completely closed except for functional openings such as an opening for letting in a quantity of coffee powder to the brewing chamber 10 and an opening for discharging coffee from the brewing chamber 10, wherein one or more of such openings may be closeable by means of a valve or the like. Components of the coffee maker 1 such as a system for heating water and supplying the water to the brewing chamber 10, which may include a pump, are well-known in the art and will not be elucidated here.

In the shown example, the coffee maker 1 according to the invention comprises a grinding module 20. Preferably, the coffee maker 1 is further equipped with a container (not shown in FIG. 1) for containing coffee beans. In such a case, when the coffee maker 1 is operated for making a cup of coffee, a number of coffee beans are allowed to flow from the container to the grinding module 20. In the grinding module 20, the coffee beans are subjected to a grinding process. Within the framework of the invention, the grinding module 20 may be of any suitable design. As a result of the grinding process of the coffee beans, coffee powder is obtained, which is suitable to be used in a process of brewing coffee.

Besides the brewing chamber 10, the coffee maker 1 comprises a heating module 30. During operation of the coffee maker 1, coffee powder is not only supplied to the brewing chamber 10, but to the heating module 30 as well, in two different quantities, wherein the quantity of coffee powder to be used in a brewing process may be much larger than the quantity of coffee powder to be subjected to a heating process in the heating module 30. For the sake of completeness, it is noted that only the brewing chamber 10 is supposed to process hot water, whereas the heating module 30 is intended to stay dry, so that the coffee powder that is heated stays dry as well. The heating module 30 serves for realizing accelerated aroma release from the coffee powder. As the aroma is supposed to reach a user of the coffee maker 1 (particularly a user's nose 2 as diagrammatically indicated in FIG. 1), the heating module 30 is provided with a suitable outlet (not shown in FIG. 1). Any suitable type of heating means may be used in the heating module 30 for realizing the heating process of the coffee powder as desired.

According to a preferred option, the coffee maker 1 comprises a dividing arrangement 40 for dividing a freshly ground quantity of coffee powder into a first quantity to be supplied to the brewing chamber 10 and a second quantity to be supplied to the heating module 30. The dividing arrangement 40 is in communication with the grinding module 20 through a transport path 21 for receiving coffee powder from the grinding module 20. Further, the dividing arrangement 40 is in communication with the brewing chamber 10 through a first distribution path 41 for discharging a first quantity of coffee powder to the brewing chamber 10, and the dividing arrangement 40 is in communication with the heating module 30 through a second distribution path 42 for discharging a second quantity of coffee powder to the heating module 30.

The coffee maker 1 comprises a controller 50 for controlling operation of the coffee maker 1. Further, the coffee maker 1 may be equipped with any suitable means for allowing the user to activate and/or control the coffee maker 1, such as an on/off button and a user interface for programming the controller 50 so as to operate the coffee maker 1 according to preferred settings. For example, the coffee maker 1 may be adapted to offer the user an option of influencing the taste of the coffee, which may at the level of the controller 50 involve setting the quantity of coffee powder to be supplied to the brewing chamber 10 and/or other parameters of the brewing process.

Based on the foregoing, it is clear that operation of the coffee maker 1 involves the following steps. In the first place, a number of coffee beans are subjected to a grinding process in the grinding module 20. The freshly ground coffee powder which is obtained in this way is transported to the dividing arrangement 40 through the transport path 21. The dividing arrangement 40 discharges a first part of the coffee powder to the first distribution path 41, so that this first part may serve as a first quantity of coffee powder to be used in the brewing chamber 10 for making coffee, and a second part of the coffee powder to the second distribution path 42, so that this second part may serve as a second quantity of coffee powder to be used in the heating module 30 for aroma enhancement, while being omitted from the actual coffee making process. In the brewing chamber 10, the first quantity of coffee powder is caused to interact with hot water, and the coffee thus obtained is let out to a suitable receptacle such as a cup 11. In the heating module 30, the second quantity of coffee powder is heated such as to have accelerated aroma release, wherein the aroma is let out from the heating module 30 by natural flow or forced flow, whatever may be appropriate, to the environment of the coffee maker 1. The controller 50 serves for controlling grinding elements of the grinding module 20, a supply of hot water to the brewing chamber 10, heating means of the heating module 30, etc.

The user of the coffee maker 1 can be expected to appreciate the release of aroma from the heating module 30. By using a separate quantity of coffee powder for aroma enhancement, and subjecting this quantity to a heating process, aroma release is obtained in a very efficient manner, while there is no bad influence on the taste of the coffee, as the coffee is made on the basis of another quantity of coffee powder.

FIG. 2 relates to a first practical embodiment of the coffee maker 1 according to the invention, and shows the following components of the coffee maker 1: the brewing chamber 10, the grinding module 20, the heating module 30 and the dividing arrangement 40. FIG. 2 also shows a container 22 for containing coffee beans, which is coupled to the grinding module 20. An opening which constitutes a combination of an outlet of the dividing arrangement 40 for discharging coffee powder to the brewing chamber 10 and an inlet of the brewing chamber 10 for letting in coffee powder from the dividing arrangement 40 is indicated by means of reference numeral 43. With reference to the earlier description of the general layout of the coffee maker 1 according to the invention, it is noted that this combined outlet/inlet 43 is part of the first distribution path 41. An inlet of the brewing chamber 10 for letting in hot water is indicated by means of reference numeral 12. Further, an opening which constitutes a combination of an outlet of the dividing arrangement 40 for discharging coffee powder to the heating module 30 and an inlet of the heating module 30 for letting in coffee powder from the dividing arrangement 40 is indicated by means of reference numeral 44. With reference to the earlier description of the general layout of the coffee maker 1 according to the invention, it is noted that this combined outlet/inlet 44 is part of the second distribution path 42.

As shown in FIG. 2, the heating module 30 may comprise a chamber 31 for accommodating the second quantity of coffee beans, heating means 32 associated with a wall of the chamber 31, and an outlet 33 for allowing the aroma obtained from the coffee beans to exit the chamber 31 and thereby flow from inside the coffee maker 1 to the environment of the coffee maker 1.

For the sake of completeness, it is noted that an option for discharge of the used-up coffee powder from the brewing chamber 10 and discharge of the used-up coffee powder from the heating module 30 is not illustrated in FIG. 2. In practice, such option is present in the coffee maker 1, but as the invention does not relate to such option, it is omitted from FIG. 2.

FIG. 3 shows the dividing arrangement 40 of the coffee maker 1 as shown in FIG. 2. The dividing arrangement 40 comprises a chamber 45 for allowing coffee powder received from the grinding module 20 to pass through, wherein one part of the coffee powder is allowed to reach the first distribution path 41 associated with the brewing chamber 10, and wherein another part of the coffee powder is allowed to reach the second distribution path 42 associated with the heating module 30. In this dividing arrangement 40 as shown, both openings 43, 44 which are part of the first distribution path 41 and the second distribution path 42, respectively, are present in a wall of the chamber 45. In order to realize a situation in which a major part of the coffee powder is allowed to move on to the brewing chamber 10 and in which only a minor part of the coffee powder is allowed to move on to the heating module 30, the opening 43 which is part of the first distribution path 41 is considerably larger than the opening 44 which is part of the second distribution path 42.

Figure 5:
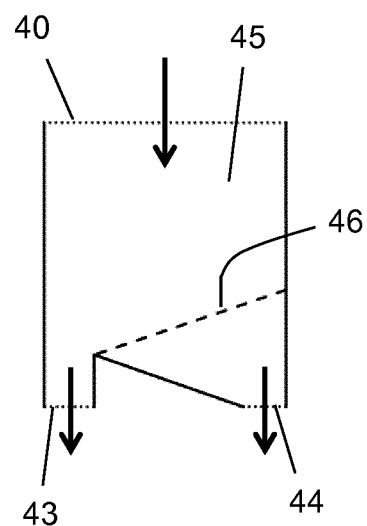
FIG. 5 diagrammatically shows a dividing arrangement of the device as shown in FIG. 4, wherein an incoming flow of coffee powder and two outgoing flows of coffee powder are indicated by means of arrows.

FIG. 4 relates to a second practical embodiment of the coffee maker 1 according to the invention, which only deviates from the first practical embodiment as shown in FIG. 2 as far as the design of the dividing arrangement 40 is concerned. The dividing arrangement 40 of the second practical embodiment is shown in FIG. 5. In this embodiment, the dividing arrangement 40 comprises a sieve 46. In particular, the sieve 46 is arranged such as to cover the opening 44 which is part of the second distribution path 42, so that it is achieved that only coffee powder particles which are small enough for passing the sieve 46 are allowed to reach the heating module 30. Hence, by applying the sieve 46 in this way, the smallest coffee powder particles are omitted from the coffee brewing process, which is beneficial to the taste of the coffee. Different from what is the case with the dividing arrangement 40 of the first embodiment, the openings 43, 44 which are part of the first distribution path 41 and the second distribution path 42, respectively, and which are present in the wall of the chamber 45 of the dividing arrangement 40, do not need to have different sizes in the case of the dividing arrangement 40 of the second embodiment, as the flow of coffee powder is divided on the basis of particle size differences. However, it is noted that this does not mean that it is necessary for the openings 43, 44 as mentioned to be of the same size in the case of the dividing arrangement 40 of the second embodiment.

All in all, when the invention is applied, an effective coffee brewing process yielding coffee of excellent taste is realized and combined with abundant aroma release. On the basis of sensing the aroma, the user of the device 1 according to the invention can be expected to perceive the quality of operation of the device 1 as being very high. The aroma release is based on heating a quantity of coffee particles, which is especially provided for the purpose of aroma release, and which can be significantly smaller than the quantity of coffee particles which is used in the actual coffee making process.

Tests have shown that it is actually possible to realize useful aroma release on the basis of heating only a small quantity of coffee powder. In the tests, a total volatile organic compounds meter (TVOC meter) was used. In the following table, the TVOC emission during a grinding process is indicated for different weights (quantities) of coffee beans, wherein it is noted that 20 grams of coffee beans are normally used for making one cup of coffee. It follows from the test results as indicated in the table that a higher weight of coffee beans involves a higher level of coffee aroma emission.

| weight (g) | TVOC-grinding (ppm) | | | TVOC-average (ppm) |
|---|---|---|---|---|
| 20 | 2.361 | 2.344 | 1.926 | 2.210 |
| 5 | 1.240 | 0.904 | 0.891 | 1.012 |
| 2.5 | 0.557 | 0.582 | 0.650 | 0.596 |

The following table relates to situations in which a number of coffee beans were subjected to a grinding process, and in which a quantity of coffee powder thus obtained was heated. Different weights of coffee powder were heated at different temperatures in order to determine the values mentioned in this table. Among other things, it follows from the table that the TVOC emission of 2.5 grams of coffee powder heated to 140° C. (coffee powder temperature) is comparable to 80% of the TVOC emission of 20 grams of coffee beans during a grinding process. When the total TVOC emission of this relatively small quantity of coffee powder, i.e. the TVOC emission associated with both the heating process and the preceding grinding process, is taken into account, it is found that the TVOC emission of 20 grams of coffee beans during a grinding process is even exceeded. Thus, it is demonstrated that heating only a small quantity of coffee powder can be effective in obtaining aroma enhancement, indeed. As mentioned earlier, at temperatures of 170° C. or higher, chemical reactions may occur in the coffee powder, whereas at lower temperatures, only an acceleration of the aroma release from the coffee powder is realized.

| weight (g) | set temperature (° C.) | coffee powder temperature (° C.) | average temperature (° C.) | TVOC-heating (ppm) | TVOC-grinding (ppm) | TVOC-total (ppm) | TVOC-average (ppm) |
|---|---|---|---|---|---|---|---|
| 5 | 140 | 84.6 | 87.2 | 1.047 | 1.012 | 2.059 | 2.051 |
| | | 86.1 | | 1.022 | | 2.034 | |
| | | 90.9 | | 1.047 | | 2.059 | |
| | 160 | 99.7 | 97.6 | 1.758 | | 2.770 | 2.834 |
| | | 96 | | 1.799 | | 2.811 | |
| | | 97.2 | | 1.908 | | 2.920 | |
| | 180 | 134.1 | 134.5 | 2.844 | | 3.856 | 3.836 |
| | | 132.1 | | 2.857 | | 3.869 | |
| | | 137.3 | | 2.772 | | 3.784 | |
| 2.5 | 140 | 88.8 | 80.9 | 0.695 | 0.596 | 1.291 | 1.214 |
| | | 72 | | 0.556 | | 1.152 | |
| | | 81.8 | | 0.604 | | 1.200 | |
| | 160 | 108.5 | 109.7 | 0.930 | | 1.526 | 1.665 |
| | | 104.4 | | 1.080 | | 1.676 | |
| | | 116.2 | | 1.197 | | 1.793 | |

-continued

| weight (g) | set temperature (° C.) | coffee powder temperature (° C.) | average temperature (° C.) | TVOC-heating (ppm) | TVOC-grinding (ppm) | TVOC-total (ppm) | TVOC-average (ppm) |
|---|---|---|---|---|---|---|---|
| | 180 | 140.9 | 139.0 | 1.780 | | 2.376 | 2.344 |
| | | 140.9 | | 1.779 | | 2.375 | |
| | | 135.2 | | 1.684 | | 2.280 | |

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details that are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The term "comprise" as used in this text will be understood by a person skilled in the art as covering the term "consist of". Hence, the term "comprise" may in respect of an embodiment mean "consist of", but may in another embodiment mean "contain/include at least the defined species and optionally one or more other species".

The invention is applicable to any type of coffee particles. In particular, the options of having coarse coffee powder and fine coffee powder, and even the option of having whole coffee beans are covered by the invention. In other words, the term "coffee particles" as used in the attached claims should be understood such as to cover the whole range from fine coffee powder to whole coffee beans.

In short, the invention relates to a method for brewing coffee, which method involves providing two separate quantities of coffee particles, wherein only a first quantity of coffee particles is used for an actual process of brewing coffee by causing this quantity to interact with an extracting medium such as hot water, and wherein another, secondary quantity of coffee particles is heated for enhanced aroma release. The second quantity of coffee particles may be small compared to the first quantity of coffee particles. The two separate quantities of coffee particles may be obtained by first providing a single quantity of coffee particles, for example by grinding a number of coffee beans in a grinding module 20, and then dividing the single quantity into the two quantities. In a device 1 which is suitable for carrying out the method, a dividing arrangement 40 may be applied for realizing a suitable distribution of coffee particles over a brewing chamber 10 and a heating module 30 of the device 1.

The invention claimed is:

1. A method for brewing coffee in a device comprising a brewing chamber, a heating module being separate from the brewing chamber and having an outlet in communication with outside of the device, a first distribution path for distributing coffee particles through the device, the first distribution path opening into the brewing chamber, and a second distribution path for distributing coffee particles through the device, the second distribution path opening into the heating module, wherein two separate quantities of coffee particles are provided, and wherein the method comprises:
   supplying only a first quantity of coffee particles to the brewing chamber through the first distribution path;
   brewing the coffee by causing the first quantity to interact with an extracting medium in the brewing chamber;
   supplying another, second quantity of coffee particles to the heating module through the second distribution path; and
   heating the second quantity of coffee particles in the heating module for enhanced aroma release.

2. The method according to claim 1, wherein the two separate quantities of coffee particles are obtained by applying a dividing arrangement coupled to both the first distribution path and the second distribution path, and wherein a single quantity of coffee particles is first provided to the dividing arrangement and then divided into the two quantities.

3. The method according to claim 2, wherein a sieve is applied for dividing the single quantity into the two quantities by separating relatively large coffee particles from relatively small coffee particles, wherein a first resulting quantity having the relatively large coffee particles is taken as the first quantity to be used in an actual process of brewing coffee, and wherein a second resulting quantity having the relatively small coffee particles is taken as the second quantity to be used for enhanced aroma release.

4. The method according to claim 1, wherein a heating process of the second quantity of coffee particles is initiated simultaneously with a process of brewing coffee on the basis of the first quantity of coffee particles.

5. The method according to claim 1, wherein a maximum temperature of a heating process of the second quantity of coffee particles is 150° C.

6. The method according to claim 1, wherein the second quantity of coffee particles is chosen to be significantly smaller than the first quantity of coffee particles.

7. A device for brewing coffee, comprising a brewing chamber for accommodating an actual process of brewing coffee on the basis of an interaction of a first quantity of coffee particles with an extracting medium, and further comprising a heating module for heating another, second quantity of coffee particles, the heating module being separate from the brewing chamber and having an outlet in communication with outside of the device for allowing aroma released from the coffee particles during a heating process to escape from the device, wherein the device is equipped with a first distribution path for distributing coffee particles through the device, the first distribution path opening into the brewing chamber, and further with a second distribution path for distributing coffee particles through the device, the second distribution path opening into the heating module.

8. The device according to claim 7, comprising a dividing arrangement coupled to both the first distribution path and the second distribution path, the dividing arrangement being adapted to receive a single quantity of coffee particles, to discharge the first quantity of coffee particles to the first distribution path for the purpose of the actual process of brewing coffee, and to additionally discharge the second quantity of coffee particles to the second distribution path for the sole purpose of aroma release.

9. The device according to claim 8, further comprising a grinding module for grinding coffee beans to coffee powder to be distributed through the device by means of the first distribution path and the second distribution path, wherein the dividing arrangement is coupled to the grinding module for receiving coffee powder particles from the grinding module.

10. The device according to claim 9, further comprising a controller for controlling operation of the device, the controller being adapted to activate the heating module simultaneously with initiating a supply of the extracting medium to the brewing chamber.

11. The device according to claim 8, wherein the dividing arrangement is adapted to let the second quantity of coffee particles be significantly smaller than the first quantity of coffee particles.

12. The device according to claim 11, wherein the dividing arrangement comprises a chamber for allowing the single quantity of coffee particles to pass through, the chamber having a first outlet opening for discharging the first quantity of coffee particles to the first distribution path, and a second outlet opening for discharging the second quantity of coffee particles to the second distribution path, the second outlet opening being significantly smaller than the first outlet opening.

13. The device according to claim 11, wherein the dividing arrangement comprises a sieve for separating relatively large coffee particles from relatively small coffee particles, the sieve being arranged with respect to the first distribution path and the second distribution path so as to enable on the one hand a discharge of a first resulting quantity having the relatively large coffee particles to the first distribution path, and to enable on the other hand a discharge of a second resulting quantity having the relatively small coffee particles to the second distribution path.

14. The device according to claim 7, further comprising a grinding module for grinding coffee beans to coffee powder to be distributed through the device by means of the first distribution path and the second distribution path.

15. The device according to claim 7, further comprising a controller for controlling operation of the device, the controller being adapted to activate the heating module simultaneously with initiating a supply of the extracting medium to the brewing chamber.

\* \* \* \* \*